(12) United States Patent
Kislinger et al.

(10) Patent No.: US 11,220,911 B2
(45) Date of Patent: Jan. 11, 2022

(54) GUIDE VANE AIRFOIL FOR THE HOT GAS FLOW PATH OF A TURBOMACHINE

(71) Applicant: MTU Aero Engines AG, Munich (DE)

(72) Inventors: Bernd Kislinger, Reisgang (DE); Markus Brettschneider, Kralsfeld (DE); Detlef Korte, Karlsfeld (DE); Bjoern Grueber, Eichenau (DE)

(73) Assignee: MTU Aero Engines AG, Munich (DE)

( * ) Notice: Subject to any disclaimer, the term of this patent is extended or adjusted under 35 U.S.C. 154(b) by 4 days.

(21) Appl. No.: 16/278,263

(22) Filed: Feb. 18, 2019

(65) Prior Publication Data

US 2019/0264568 A1    Aug. 29, 2019

(30) Foreign Application Priority Data

Feb. 26, 2018   (DE) .......................... 102018202888.5

(51) Int. Cl.
*F01D 5/14*   (2006.01)
*F01D 9/04*   (2006.01)

(52) U.S. Cl.
CPC ............. *F01D 5/142* (2013.01); *F01D 5/141* (2013.01); *F01D 5/145* (2013.01); *F01D 9/041* (2013.01);
(Continued)

(58) Field of Classification Search
CPC .......... F01D 5/141; F01D 5/142; F01D 9/041; F01D 5/145; F01D 9/042; F04D 29/544; F05D 2220/31; F05D 2220/32
See application file for complete search history.

(56) References Cited

U.S. PATENT DOCUMENTS 3,883,264 A * 5/1975 Rao ........................... F01D 1/04
                                                    415/119
6,099,248 A * 8/2000 Mumm ................... F01D 5/141
                                                    415/192
(Continued)

FOREIGN PATENT DOCUMENTS

DE    102008055824    5/2009
EP       0916812 A1   5/1999
(Continued)

OTHER PUBLICATIONS

Extract of Duta, Constantin Mihai: "The Derivation of a Time-Harmonic Adjoint Method—The Use of the Adjoint Method for the Minimisation of Forced Vibration in Turbomachinery," Dissertation, VDM Verlag, ISBN 978-3-639-18770-0, Aug. 19, 2009.
(Continued)

*Primary Examiner* — Eldon T Brockman
*Assistant Examiner* — Andrew Thanh Bui
(74) *Attorney, Agent, or Firm* — Davidson, Davidson & Kappel, LLC

(57) ABSTRACT

A guide vane airfoil for placement in a flow path portion of a turbomachine is provided, which, relative to a flow pattern in flow path portion, has a leading edge and, downstream thereof, a trailing edge, as well as a suction side and a pressure side; relative to a longitudinal axis of the turbomachine, viewed in the axial direction, in a radially inner portion, forming a first angle α with a circular arc about the longitudinal axis, and, in a radially outer portion, a second angle γ with a circular arc about the longitudinal axis. The guide vane airfoil is inclined in the outer portion, thus γ–90°, in terms of absolute value, being >0° (|γ–90°|>0°), and the guide vane airfoil being more highly inclined in the outer portion than in the inner portion, thus γ–90°, in terms of absolute value, being >α–90° (|γ–90°|>α–90°).

16 Claims, 3 Drawing Sheets

(52) U.S. Cl.
CPC .......... *F01D 9/047* (2013.01); *F05D 2220/32* (2013.01); *F05D 2240/124* (2013.01); *F05D 2240/128* (2013.01); *F05D 2240/30* (2013.01); *F05D 2250/314* (2013.01); *F05D 2250/38* (2013.01); *F05D 2250/71* (2013.01); *F05D 2260/941* (2013.01); *F05D 2260/96* (2013.01)

(56) References Cited

U.S. PATENT DOCUMENTS

| | | | |
|---|---|---|---|
| 7,101,145 B2 * | 9/2006 | Tsuchiya | F01D 5/141 415/119 |
| 7,794,202 B2 | 9/2010 | Borthwick et al. | |
| 8,167,548 B2 | 5/2012 | Greim et al. | |
| 8,167,567 B2 * | 5/2012 | Kirchner | F04D 29/324 416/223 R |
| 8,613,592 B2 * | 12/2013 | Elorza Gomez | F04D 29/544 415/208.2 |
| 9,683,449 B2 | 6/2017 | He et al. | |
| 9,771,803 B2 | 9/2017 | Cornelius et al. | |
| 2005/0008494 A1 | 1/2005 | Tsuchiya | |
| 2016/0201468 A1 * | 7/2016 | Krishnan | F01D 5/141 415/208.1 |

FOREIGN PATENT DOCUMENTS

| | | |
|---|---|---|
| EP | 1333181 A1 | 8/2003 |
| EP | 2103782 | 9/2009 |
| EP | 2434094 | 3/2012 |
| EP | 3045660 | 7/2016 |
| GB | 1116580 | 6/1968 |
| WO | WO2005005784 | 1/2005 |

OTHER PUBLICATIONS

Bailie:"Effects of Inlet Guide Vane Flow Control on Forced Response of a Transonic Fan," Dissertation, 2009.
Willy J. G. Braunling: "Fan-Sektion bei Turbofantriebwerken" In: "Flugzeugtriebwerke", Jan. 1, 2009 (Jan. 1, 2009 ), Springer, pp. 134-138, see machine translation.

* cited by examiner

GUIDE VANE AIRFOIL FOR THE HOT GAS FLOW PATH OF A TURBOMACHINE

This claims the benefit of German Patent Application DE 102018202888.5, filed Feb. 26, 2018 and hereby incorporated by reference herein.

The present invention relates to a guide vane airfoil for placement in the flow path portion of a turbomachine, as well to as a corresponding module.

BACKGROUND INFORMATION

The turbomachine can be a jet engine, such as a turbofan engine, for example. The turbomachine is functionally divided into a compressor, a combustion chamber and a turbine. In the case of the jet engine, for instance, intake air is compressed by the compressor and burned by added jet fuel in the immediately downstream combustion chamber. The resulting hot gas, a mixture of combustion gas and air, flows through the immediately downstream turbine and is thereby expanded. The hot gas traverses a volume on a path from the combustion chamber via the turbine to the nozzle; initially a turbine module and thus a portion of this path or volume being considered here. The part of the turbine module traversed by the hot gas flow is referred to as "hot gas flow path." The hot gas flow path forms a turbine-side section of the flow path of the turbomachine. Besides the "hot gas flow path," the flow path also includes a portion disposed on the compressor side of the combustion chamber, where a compressor module is traversed by the flow of the intake air.

Upon assembly, the turbine and the compressor are each typically subdivided into a plurality of modules; thus, they can include a high-pressure, intermediate-pressure and/or a low-pressure turbine module or a high-pressure, intermediate-pressure and/or a low-pressure compressor module, for example. Thus, each of these modules generally has a plurality of stages; each stage being assembled from a guide vane ring and a rotor blade ring downstream thereof. The guide vane airfoil in question is part of such a guide vane ring that has or is composed of one or a plurality of guide vane segments; the guide vane ring then having a plurality of typically structurally identical guide vane airfoils that extend circumferentially all around. Along with the reference to a jet engine, this is intended to initially illustrate the present subject matter, but not to limit the universality of the inventive idea. The turbomachine can also be a stationary gas turbine, for example.

The European Patent Application 0 916 812 A1 describes an example of a turbine module having guide vanes that are radially oriented at the rotor-side and stator-side ends thereof and are circumferentially inclined in a section therebetween.

SUMMARY OF THE INVENTION

It is a technical object of the present invention to provide an especially advantageous guide vane airfoil, as well as an advantageous module, in particular turbine module or compressor module, having such a guide vane airfoil.

The present invention provides guide vane airfoil and a module. As discussed in detail in the following, the guide vane airfoil is inclined in a radially outer portion (tilted relative to a radial direction). However, the guide vane airfoil is not tilted over the entire extent thereof, rather is at least less inclined in a radially inner portion than in the outer portion. In other words, along the extent of the guide vane airfoil from radially inwardly to radially outwardly, a middle portion features a bend. The relatively slight inclination radially inwardly is aerodynamically advantageous, namely helps reduce aerodynamic losses and thus improve efficiency (in comparison to an airfoil that is inclined throughout). Thus, any efficiency disadvantage that may result from the inclination is able to be at least reduced or kept to a minimum. If there is too high of an inclination radially inwardly, the Mach numbers, for example, could become too high on the suction side, or secondary losses could also occur.

On the other hand, the inclination of the guide vanes is advantageous insofar as it provides a certain decoupling of or reduction in the excitation induced by the upstream disposed rotor blade ring. To that end, the present invention provides that the assembly, which induces the excitation (the upstream positioned rotor blade ring), not be inclined, rather that the excited assembly be inclined or more highly inclined; compare claim 12. The inclination of the downstream disposed guide vane assembly makes it possible to reduce the excitation thereof by the wake of the upstream rotor blade assembly. The wake does not impinge on the entire guide vane airfoil at one point in time, rather with a certain time characteristic as a function of the inclination thereof. Figuratively speaking, the guide vane airfoil does not receive a full impact, rather the impact is somewhat distributed or spread out. This may be advantageous with respect to a high cycle fatigue resistance, namely at least reduce natural frequency excitations, for example.

The fact that the guide vane assembly is more highly inclined than the upstream rotor blade assembly, thus that the excited and not the exciting assembly is adapted, is advantageous here because of structural-mechanical considerations. The inclination of the airfoil displaces namely the centroid thereof. In the case of a rotor blade airfoil, the centroid may cause a significant mechanical loading, for instance of the airfoil itself or also of the region of transition to the shroud, in response to the centrifugal forces.

Preferred embodiments will become apparent from the dependent claims and the entire Specification; in the description of the features, a distinction not always being specifically made between the guide vane airfoil, the corresponding module, in particular the turbine module or compressor module, and the turbomachine as a whole. Furthermore, the disclosure is also to be read to at least imply all claim categories.

In the context of the present disclosure, "axial" generally relates to the longitudinal axis of the module, therefore, to the longitudinal axis of the turbomachine, which coincides, for example, with an axis of rotation of the rotors. "Radial" refers to the radial directions which are orthogonal thereto and point away therefrom; and a "rotation," respectively "rotating" or the "direction of rotation" relate to the rotation about the longitudinal axis. In the context of the present disclosure, "a" and "an" are generally to be read as indefinite articles and, therefore, unless expressly stated otherwise, always as "at least one." Thus, for example, the guide vane ring or the guide vane segment having the guide vane airfoil according to the present invention has a plurality of such airfoils that are disposed rotationally symmetrically to one another about the longitudinal axis, for example.

As set forth in the main claim, to describe the guide vane airfoil "featuring a bend," reference is initially made to a first angle α. Considering the guide vane airfoil in the axial direction (looking at the leading edge thereof), this angle is formed between a visible edge of the guide vane airfoil in a radially inner portion thereof, and by a circular arc about the longitudinal axis. Specifically, angle α is taken between the visible edge and a tangent to said circular arc that is placed on the circular arc where the visible edge meets or intersects the circular arc. The visible edge is apparent in the axial view, so to speak as the circumferential edge of the airfoil. It extends on the suction side where the airfoil has its maximum thickness (profile thickness).

Also considered is a second angle γ formed by the visible edge in a radially outer portion and by a circular arc about the longitudinal axis, specifically by a tangent to the circular arc (where the visible edge meets or intersects it). These considerations generally relate to an axial view and, therefore, do not include any axial component of the extent of the visible edge or of the line of the maximum profile thickness. In other words, the axial view considers an orthogonal projection of the airfoil into a plane that is perpendicular to the longitudinal axis (and the angles may be measured in this plane).

The inclination of the guide vane airfoil in the radially outer portion mentioned at the outset is derived from γ−90° being greater in terms of absolute value than 0°. Thus, taking as a basis the absolute value of the difference, this absolute value should be greater than 0° (specifically, angle γ may be greater or smaller than 90°; see below for more details). As discussed above, it is also intended that the guide vane airfoil be less inclined in the radially inner portion. Accordingly, in terms of absolute value, thus the absolute value of this difference, γ−90° is greater than α−90°. Regardless of whether the airfoil is inclined in the radially outer portion toward the suction side (γ>90°) or toward the pressure side (γ<90°), the difference from 90° and thus the tilt relative to the radial direction should be greater in any case than in the radially inner portion.

A guide vane airfoil of this kind may be additively manufactured, for example, from a formless or form-neutral material by regionally selective solidification, for instance in a powder bed process, thus, on the basis of a data model. On the other hand, a casting manufacturing is also possible, however.

In a preferred embodiment, first angle α, thus the inner angle, is at least 85°, at least 87°, respectively 89° being also and especially preferred. Advantageous upper limits, which are to be generally disclosed, also independently of the just mentioned lower limits (and vice versa) are at most 95°, 93° respectively 91°, with increasing preference in the order given. Especially preferred is a radially inner guide vane airfoil that is not inclined at all, thus angle α is 90°. Reference is made to the advantages indicated at the outset, whereby the relatively slight inclination radially inwardly makes it possible to at least limit efficiency losses that may arise in comparison to a design having no inclination at all.

In accordance with a preferred specific embodiment, the guide vane airfoil is inclined in the outer portion toward the suction side, thus angle γ in the outer portion is greater than 90°. Advantageous lower limits are at least 95°, 97°, 99°, respectively 100° (with increasing preference in the order given). Advantageous upper limits, which are also to be disclosed independently of the lower limits (and vice versa) are at most 120°, 115°, respectively 110° (with increasing preference in the order given).

Taken together, angles α and β reveal that the profile is less inclined radially inwardly than radially outwardly. Alternatively, one could also consider an angle of intersection β formed by the visible edge radially inwardly and the visible edge radially outwardly. This angle should be at least 5°, for example, upper limits (that are independent thereof) possibly being at most 40°, 30° respectively, 20°.

In a preferred specific embodiment, the guide vane airfoil is inclined in the outer portion toward the pressure side; thus, angle γ is smaller than 90°. In comparison to the airfoil that is inclined toward the suction side, the inclination toward the pressure side is preferably more likely to be slight, namely γ is preferably at least 85° (upper limits possibly being 89°, respectively 88°).

The following embodiments relate to the radial extents of the inner, respectively outer portion (or also of the middle portion therebetween). As a reference, the percentages thereby relate to the radial height of the flow path portion (taken between the inner and outer shroud) and more specifically in the region of the airfoil (axially, where the airfoil has its maximum profile thickness). In the case of a contoured annulus, the radial height is thereby taken as a basis as average value across a pitch.

The flow path portion may be the hot gas flow path or a compressor-side section of the flow path. In a preferred embodiment, the radially inner portion has a radial extent that constitutes at least 20% and (independently thereof) at least 50% of the radial height of the flow path portion. Generally, thus independently of this quantitative information, first angle α is preferably constant over the radial inner portion.

In a preferred specific embodiment, the radially outer portion has a radial extent that constitutes at least 25% and (independently thereof) at most 55% of the radial height of the flow path portion. Again, also independently thereof, second angle γ is preferably constant over the outer portion.

In a preferred specific embodiment, a middle portion, in which the inclination changes between the inner and the outer portion, thus where the bend is situated, has a radial extent of at least 5% and (independently thereof) of at most 25% of the radial height of the flow path portion.

The visible edge may extend rectilinearly in the radially inner and outer portion and, within the middle portion located therebetween, which preferably adjoins the radially inner and outer portion, merge transitionally from first angle α into second angle γ with a monotonic, in particular strictly monotonic curvature profile. In other words, the entire curvature profile or inclination profile may be free of curvature direction changes or of inflection points.

The present invention also relates to a guide vane ring and a guide vane segment, each having a guide vane airfoil as described herein, preferably in each case a plurality of structurally identical and mutually rotationally symmetrically disposed guide vane airfoils.

Preferably, a guide vane segment includes a plurality of guide vane airfoils, and all of the guide vane airfoils are designed in accordance with the present invention, in particular also designed to be structurally identical and/or disposed rotationally symmetrically to one another.

In some specific embodiments, all guide vane airfoils of the guide vane ring are designed in accordance with the present invention, in particular also designed to be structurally identical and/or disposed rotationally symmetrically to one another.

The present invention also relates to a module, for example, a turbine module or compressor module, having a guide vane ring and a rotor blade ring disposed upstream (directly in front) thereof. Any inclination of the rotor blade airfoils thereof is less than that of the guide vane airfoil in the radially outer portion. The rotor blade airfoils are preferably not inclined at all. The present invention also relates to a turbomachine, in particular a jet engine having such a module.

The present invention also relates to a method for designing such a module, respectively a corresponding turbomachine. A wake of the upstream disposed rotor blade ring is thereby considered using a computational fluid dynamics (CFD) simulation, for example. The inclination of the downstream disposed rotor blade airfoil(s) is then adapted in a way that at least reduces the excitation thereof by the upstream disposed rotor blade assembly.

BRIEF DESCRIPTION OF THE DRAWINGS

The present invention is explained in greater detail in the following with reference to an exemplary embodiment; within the scope of the coordinated independent claims, the individual features possibly being essential to the present invention in other combinations as well, and, as above, no distinction being specifically made among the different claim categories.

In the drawing.

DETAILED DESCRIPTION

Figure 1:
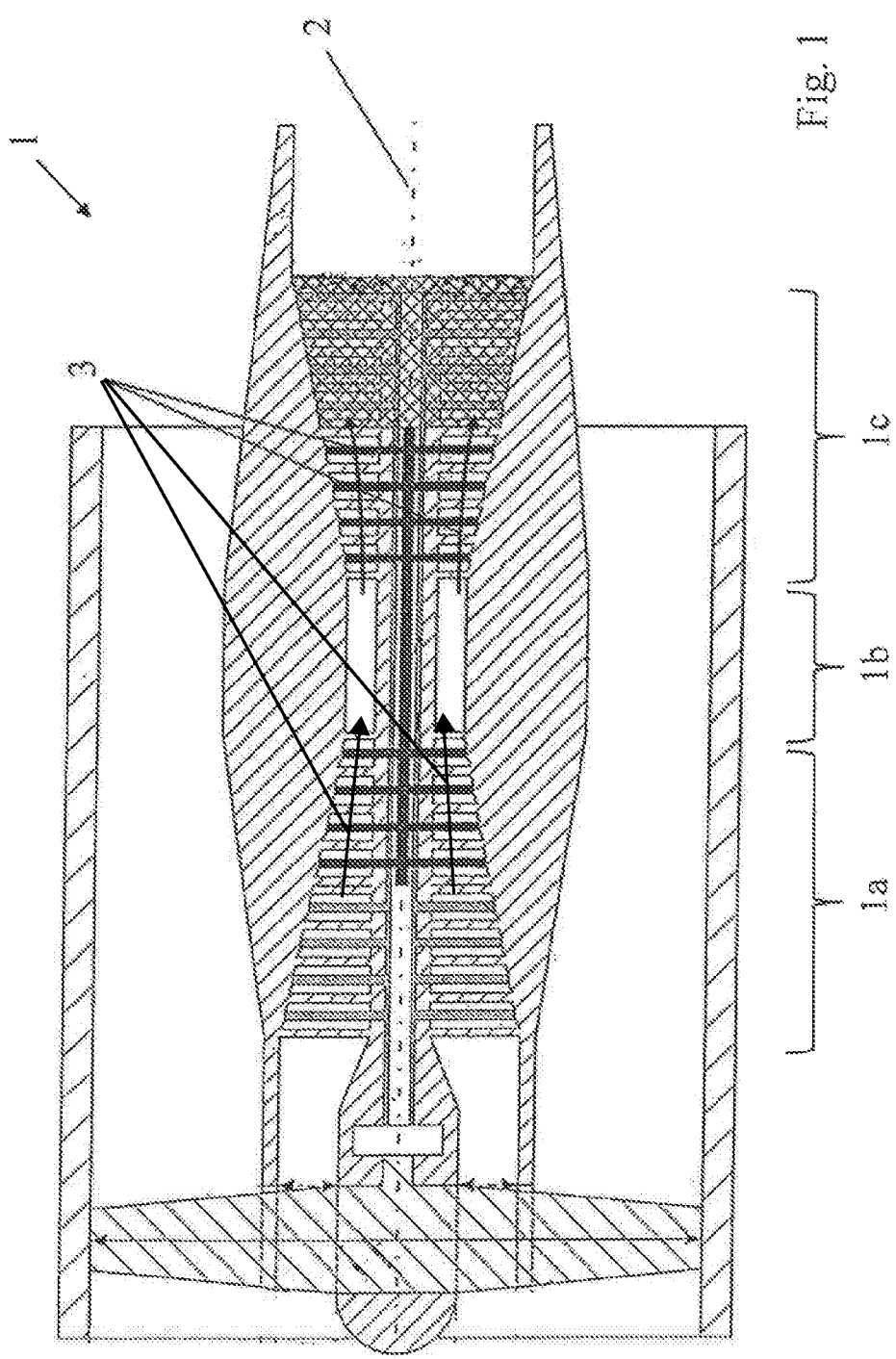
FIG. 1 shows an axial cross-sectional view of a jet engine.

In an axial cross-sectional view, FIG. 1 shows a turbomachine 1, specifically a jet engine. Turbomachine 1 is functionally divided into a compressor 1a, a combustion chamber 1b and a turbine 1c. Both compressor 1a and turbine 1c are made up of a plurality of stages in each case; each stage is composed of a guide vane ring and a subsequent rotor blade ring. During operation, the rotor blade rings rotate about longitudinal axis 2 of turbomachine 1. The intake air is compressed in compressor 1a, in particular with the aid of rotor blade rings, which rotate about longitudinal axis 2, and then burned by added jet fuel in immediately downstream combustion chamber 1b. The hot gas flows through a flow path portion 3, namely the hot gas flow path, and thereby drives the rotor blade rings that rotate about longitudinal axis 2.

Figure 2:
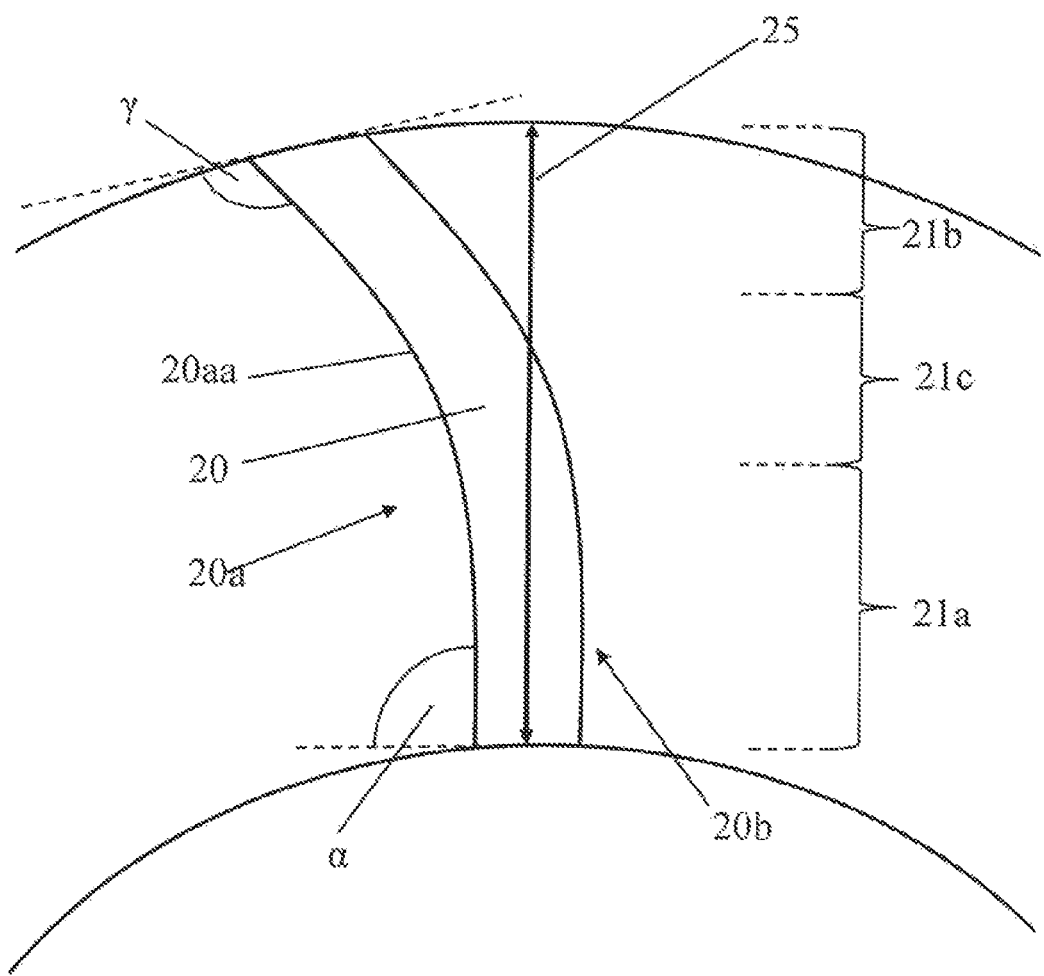
FIG. 2 is an axial view of the extent of a guide vane airfoil according to the present invention.

FIG. 2 shows a first variant of a guide vane airfoil 20 according to the present invention, which is not inclined in a radially inner portion 21a, but is in a radially outer portion 21b. Accordingly, first angle α is 90°; however, second angle γ is approximately 100° (the view is schematic and, for purposes of illustration, is drawn with an exaggerated inclination).

Due to the inclination in radially outer portion 21b, an excitation is reduced by the wake of the immediately upstream rotor blade assembly (for details, compare the introductory part of the Specification). On the other hand, however, guide vane airfoil 20 is not inclined throughout because flow disadvantages and thus efficiency losses are at least able to be reduced by the rectilinear extent in inner portion 21a (for details, also compare the introductory part of the Specification). Guide vane airfoil 20 in accordance with FIG. 2 is inclined toward suction side 20a; pressure side 20b is circumferentially opposite. Angles α and γ are taken on the suction side in the axial view toward visible edge 20aa of guide vane airfoil 20, along which guide vane airfoil 20 has its maximum profile thickness.

Figure 3:
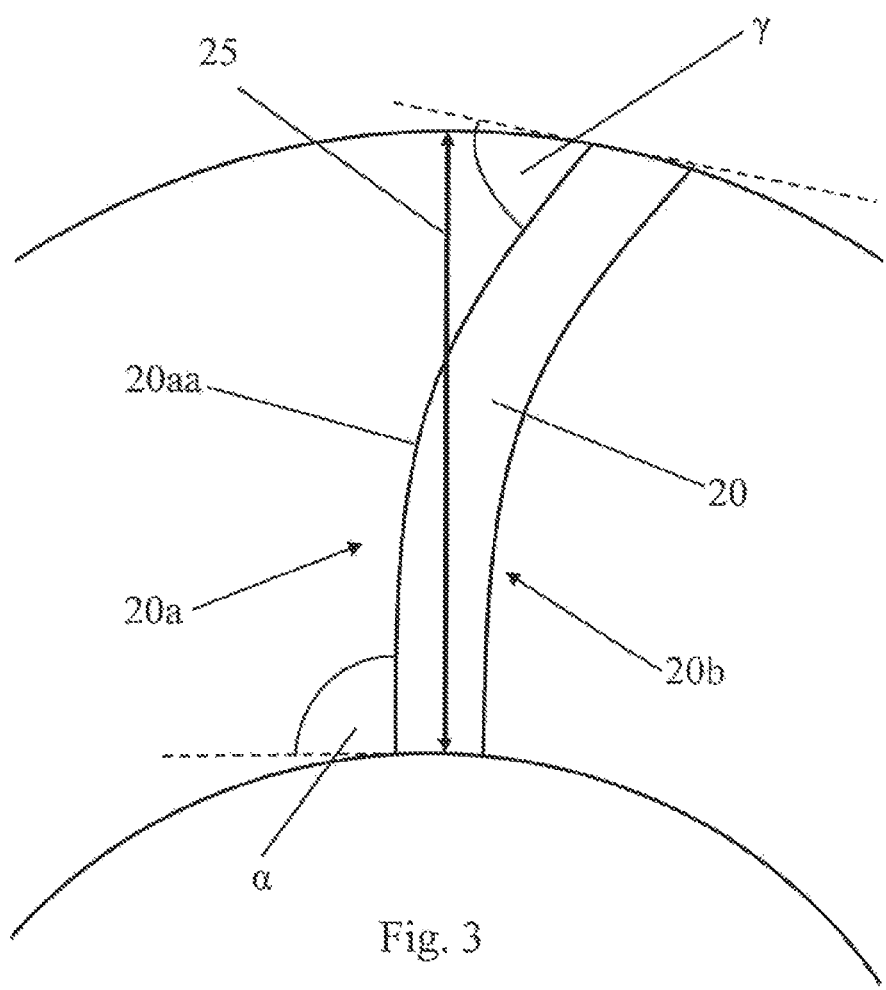
FIG. 3 is an axial view of the extent of another guide vane airfoil according to the present invention.

In the variant in accordance with FIG. 3, guide vane airfoil 20 is inclined toward the pressure side, thus is in accordance with angle γ<90°. Specifically, it is disposed at 87° in this example, which, again, is not rendered proportionally in the drawing. Angle α is 90°.

Both in the variant in accordance with FIG. 2, as well as in that in accordance with FIG. 3, first portion 21a extends over approximately 40% of radial path height 25; radially outer portion 21b over 45%. In correspondence therewith, radially middle portion 21c extends over 15% of path height 25. Specifically, it is self-evident that a different partitioning would also be possible (for details, compare the introductory part of the Specification).

REFERENCE NUMERAL LIST turbomachine 1
compressor 1a
combustion chamber 1b
turbine 1c
longitudinal axis 2
flow path portion 3
guide vane airfoil 20
suction side 20a
visible edge 20aa
pressure side 20b
radially inner portion 21a
radially outer portion 21b
radially middle portion 21c
radial path height 25

What is claimed is:

1. A guide vane airfoil for placement in a flow path portion of a turbomachine, the guide vane airfoil, relative to a flow pattern in the flow path portion, comprising:
   a leading edge;
   a trailing edge downstream of the leading edge;
   a suction side and a pressure side;
   a visible edge on the suction side of the guide vane airfoil,
      relative to a longitudinal axis of the turbomachine, viewed in the axial direction,
      in a radially inner portion, forming a first angle α with a circular arc about the longitudinal axis, and,
      in a radially outer portion, a second angle γ with a further circular arc about the longitudinal axis,
   and
      the guide vane airfoil being inclined in the outer portion, thus γ−90°, in terms of absolute value, being greater than 0° (|γ−90°|>0°), and
      the guide vane airfoil being more highly inclined in the outer portion than in the inner portion, thus γ−90°, in terms of absolute value,
      being greater than α−90° (|γ−90°|>α−90°);
   wherein the visible edge in the radially inner and outer portion extends rectilinearly and, within a middle portion located between and adjoining the radially inner portion and the radially outer portion, merges transitionally from the first angle α into the second angle γ with a monotonic curvature profile, the middle portion having a middle portion radial extent that constitutes at least 5% and at most 25% of a radial height of the flow path portion, so that the inner portion with the radially inner portion rectilinearly-extending visible edge has an inner portion radial extent and the radially outer portion with the radially outer portion rectilinearly-extending visible edge together constitute at least 75% and at most 95% of the radial height of the flow path portion.

2. The guide vane airfoil as recited in claim 1 wherein the first angle α in the inner portion is at least 85° and at most 95°.

3. The guide vane airfoil as recited in claim 2 wherein the first angle α in the inner portion is 90°.

4. The guide vane airfoil as recited in claim 1 wherein the outer portion is inclined toward the suction side so that the second angle γ in the outer portion is greater than 90°.

5. The guide vane airfoil as recited in claim 4 wherein the second angle γ in the outer portion is at least 95° and at most 120°.

6. The guide vane airfoil as recited in claim 1 wherein the outer portion is inclined toward the pressure side so that the second angle γ in the outer portion is less than 90°.

7. The guide vane airfoil as recited in claim 6 wherein the second angle γ in the outer portion is at least 85° and less than 90°.

8. The guide vane airfoil as recited in claim 1 wherein the inner portion with the radially inner portion rectilinearly-extending visible edge has an inner portion radial extent that constitutes at least 20% and at most 50% of the radial height of the flow path portion.

9. The guide vane airfoil as recited in claim 1 wherein the radially outer portion with the radially outer portion rectilinearly-extending visible edge has an outer portion radial extent that constitutes at least 25% and at most 55% of the radial height of the flow path portion.

10. The guide vane airfoil as recited in claim 8 wherein the monotonic curvature profile is a strictly monotonic curvature profile.

11. A guide vane segment comprising guide vane airfoils, each guide vane airfoil of the guide vane airfoils being as recited in claim 1.

12. A module comprising:
a guide vane ring having at least one guide vane segment as recited in claim 11, and, disposed upstream of the guide vane ring,
a rotor blade ring having rotor blade airfoils; any inclination of the rotor blade airfoils being less than that of the guide vane airfoil in the radially outer portion.

13. A jet engine comprising the module as recited in claim 12.

14. A method for designing the module as recited in claim 12 comprising considering a wake of the upstream disposed rotor blade ring and, as a function thereof, adapting the inclination of the guide vane airfoil in the radially outer portion.

15. The guide vane airfoil as recited in claim 8 wherein the inner portion with the radially inner portion rectilinearly-extending visible edge has an inner portion radial extent that constitutes at least 20% and at most 50% of the radial height of the flow path portion and the radially outer portion with the radially outer portion rectilinearly-extending visible edge has an outer portion radial extent that constitutes at least 25% and at most 55% of the radial height of the flow path portion.

16. The guide vane airfoil as recited in claim 8 wherein the inner portion with the radially inner portion rectilinearly-extending visible edge has an inner portion radial extent that constitutes 40% of the radial height of the flow path portion and the radially outer portion with the radially outer portion rectilinearly-extending visible edge has an outer portion radial extent that constitutes 45% of the radial height of the flow path portion.

* * * * *